(12) United States Patent
Poston et al.

(10) Patent No.: US 9,213,555 B2
(45) Date of Patent: Dec. 15, 2015

(54) OFF-SCREEN WINDOW CONTROLS

(71) Applicant: BMC Software, Inc., Houston, TX (US)

(72) Inventors: Ricky Poston, Austin, TX (US); Michael Cooper, Kingwood, TX (US)

(73) Assignee: BMC Software, Inc., Houston, TX (US)

( * ) Notice: Subject to any disclaimer, the term of this patent is extended or adjusted under 35 U.S.C. 154(b) by 160 days.

(21) Appl. No.: 13/850,724

(22) Filed: Mar. 26, 2013

(65) Prior Publication Data

US 2014/0282225 A1    Sep. 18, 2014

Related U.S. Application Data

(60) Provisional application No. 61/801,042, filed on Mar. 15, 2013.

(51) Int. Cl.
*G06F 15/00* (2006.01)
*G06F 13/00* (2006.01)
*G06F 9/44* (2006.01)
*G06F 3/0481* (2013.01)

(52) U.S. Cl.
CPC .......... *G06F 9/4443* (2013.01); *G06F 3/04812* (2013.01)

(58) Field of Classification Search
CPC ..................... G06F 9/4443; G06F 3/04812

USPC ......... 715/709, 744, 771, 765, 825, 781, 784, 715/794, 851–853, 700, 808
See application file for complete search history.

(56) References Cited

U.S. PATENT DOCUMENTS

| | | | |
|---|---|---|---|
| 2007/0083813 A1* | 4/2007 | Lui et al. | 715/709 |
| 2008/0155427 A1* | 6/2008 | Leblay et al. | 715/744 |
| 2013/0212522 A1* | 8/2013 | Fleizach | 715/784 |
| 2013/0227472 A1* | 8/2013 | Sosinski | 715/794 |

* cited by examiner

*Primary Examiner* — Kevin Nguyen
(74) *Attorney, Agent, or Firm* — Brakes Hughes Bellermann LLP

(57) ABSTRACT

A window detector may detect that an off-screen portion of a window is not visible within a display that is providing the window, the off-screen portion including at least one window control element. A control identifier may determine at least one supplemental control element corresponding to, and providing analogous functionality of, the at least one window control element. A control view generator may provide the at least one supplemental control element visibly within the display. A supplemental window controller may execute the analogous functionality with respect to the window, based on receipt of user input by way of the at least one supplemental control element.

20 Claims, 5 Drawing Sheets

OFF-SCREEN WINDOW CONTROLS

CROSS REFERENCE TO RELATED APPLICATIONS

This application claims the benefit under 35 U.S.C. §119(e) of U.S. Provisional Patent Application Ser. No. 61/801,042, filed on Mar. 15, 2013, and titled, "OFF-SCREEN WINDOW CONTROL," the disclosure of which is incorporated by reference herein in its entirety.

TECHNICAL FIELD

This description relates to user interface control techniques.

BACKGROUND

Window-based techniques are commonly used in computer systems to provide users with easy and intuitive interactions with the computer systems. For example, a graphical user interface (GUI) may be provided in the context of an Internet browser application, to thereby provide a user with convenient techniques for browsing the Internet. More generally, such windows may be provided by virtually any operating system, application, or any computing context in which users may benefit from the types of graphics-based control provided by window-based user interfaces.

Included among the many features and functions of such window-based user interfaces is the ability to control a shape, size, and/or position of individual windows that are currently being displayed, e.g., on a display screen. For example, the display screen may be utilized to display a plurality of windows, which may be associated with one or more corresponding applications. By selecting a particular window, a user may view the contents of that window, and may modify the selected window in a desired manner. For example, the user may increase a size of the window in order to view the contents thereof more easily, or may decrease a size of the window, in order to view contents of one or more of the other windows in parallel therewith.

In these and other contexts, it may occur that a portion of a given window may not be visible to the user. For example, the user may re-locate a selected window (e.g., so as to view a second window in a desired fashion, as just referenced), and may thereby cause a portion of the re-located window to appear to be off of the display being used to provide the various windows. Similarly, for example, a parent window may spawn a child window that may be generated with a portion of the child window similarly appearing to be off screen (and therefore not viewable) with respect to the display.

In these and similar contexts, it may occur that control elements provided in conjunction with a window for operating, interacting with, or otherwise controlling features and functions of the window, may be located within the portion of the window that is not currently viewable within the display. As a result, it may occur that users are limited in their ability to control the corresponding window in a manner that is convenient and efficient for each user.

SUMMARY

According to one general aspect, a system may include instructions stored on a non-transitory computer readable storage medium and executable by at least one processor. The system may include a window detector configured to cause the at least one processor to detect that an off-screen portion of a window is not visible within a display that is providing the window, the off-screen portion including at least one window control element. The system may include a control identifier configured to cause the at least one processor to determine at least one supplemental control element corresponding to, and providing analogous functionality of, the at least one window control element. The system may include a control view generator configured to cause the at least one processor to provide the at least one supplemental control element visibly within the display. The system may include a supplemental window controller configured to cause the at least one processor to execute the analogous functionality with respect to the window, based on receipt of user input by way of the at least one supplemental control element.

According to another general aspect, a method may include detecting that an off-screen portion of an application window is not visible within a display that is providing the application window, the off-screen portion including at least one window control element. The method may include determining at least one supplemental control element corresponding to, and providing analogous functionality of, the at least one window control element. The method may include providing the at least one supplemental control element visibly within the display. The method may include executing the analogous functionality with respect to the application window, based on receipt of user input by way of the at least one supplemental control element.

According to another general aspect, a computer program product may include instructions recorded on a non-transitory computer readable storage medium and configured to cause at least one processor to detect that an off-screen portion of an application window is not visible within a display that is providing the application window, the off-screen portion including at least one window control element, and determine at least one supplemental control element corresponding to, and providing analogous functionality of, the at least one window control element. The instructions may be further configured to cause the at least one processor to provide the at least one supplemental control element visibly within the display, and execute the analogous functionality with respect to the application window, based on receipt of user input by way of the at least one supplemental control element.

The details of one or more implementations are set forth in the accompanying drawings and the description below. Other features will be apparent from the description and drawings, and from the claims.

DETAILED DESCRIPTION

Figure 1:
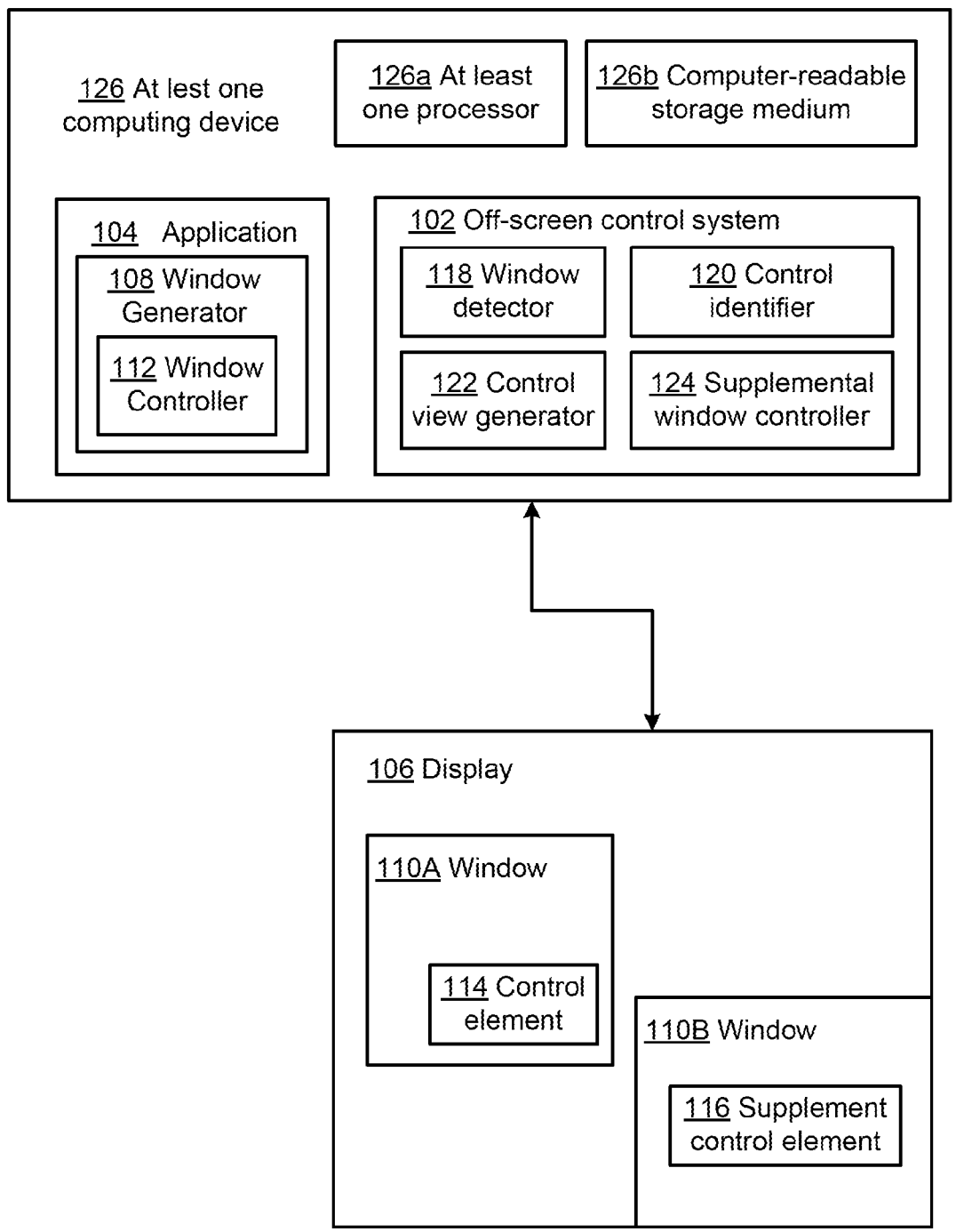
FIG. 1 is a block diagram of a system for off-screen window control.

FIG. 1 is a block diagram of a system 100 for off-screen window control. In the example of FIG. 1, an off-screen control system 102 is illustrated and described as working in conjunction with an application 104, that is itself configured to interact with a display 106, such that a window generator 108 of the application 104 provides a plurality of windows 110A, 110B thereon. More specifically, as shown and described herein, the off-screen control system 102 may be configured to provide a user of the system 100 with a full range of available control features provided in conjunction with the windows 110A, 110B, even when a portion of one of the windows 110A, 110B is positioned outside of a visible area of the display 106 (as illustrated and described in more detail below, e.g., with respect to the window 110B). In this way, the user of the system 100 may enjoy a high degree of flexibility and convenience with respect to arranging a desired shape, position, and/or function of each of the windows 110A, 110B, even when such a window currently has an off-screen portion.

In the example of FIG. 1, it may be further appreciated that the application 104 may represent virtually any software application that is associated with, e.g., provides, windows represented by the windows 110A, 110B in FIG. 1. For example, as referenced above, the application 104 may represent an Internet browser application, so that the windows 110A, 110B may represent instances of such browser windows. More generally, however, the application 104 may represent virtually any word processing, spreadsheet, database, editing (e.g., photo, video, or audio editing), graphic design, gaming, or virtually any other type of software application. For example, the application 104 may represent, or be associated with, software code implemented by an operating system, in which case, for example, the windows 110A, 110B may represent, e.g., windows for navigating a file system of the operating system, control panels for managing peripherals associated with the operating system, or virtually any other window that may be provided by the operating system for management or control thereof.

Thus, considering the wide range of applications represented by the application 104, it may be appreciated that the display 106 may similarly represent virtually any hardware/software that may interface with the application 104 so as to visibly provide the windows 110A, 110B. For example, the display 106 may represent, or be associated with, the hardware and associated software of a conventional computer monitor. In other implementations, the display 106 may represent a virtual display that is provided within a computer monitor, such as may occur during remote access of computing resources over a network. The display 106 may be operated in conjunction with a separate computer (e.g., as in the case of a desktop computer), or may be more closely integrated with supporting computer resources (as in the case of e.g., laptop, notebook, tablet, or mobile device(s)).

As a matter of terminology, it may be appreciated that a number of different terms exist, which, in conventional use, may be used essentially interchangeably for purposes of understanding and describing the system 100 of FIG. 1. For example, as referenced above, the term "display" may be utilized in common meaning to refer to some or all of the associated hardware/software associated with visibly showing the windows 110A, 110B. In such usages, the display 106 would be understood to include, e.g., a pixilated screen, which is activated in conventional manners to provide the individual windows 110A, 110B. Also in conventional usages, however, the terms "display" and "screen," as well as other terms (e.g., "monitor"), may be used to refer to that portion of a viewing device which is seen by a user as providing the windows 110A, 110B. Thus, for purposes of this description, it may be appreciated that terms such as "display" and "screen" and similar terms, should be understood in their broadest sense to include or represent virtually any defined viewing area which visibly provides the windows 110A, 110B. For example, such a viewing area may be a subset or portion of a larger display/screen, which is associated with the application 104, and which itself includes the various windows 110A, 110B.

In the example of FIG. 1, the application 104 is illustrated as including a window generator 108, which should be understood to be operational to generate and otherwise manage the windows 110A, 110B. For example, the window generator 108 may create a new window in response to a user request for such a new window, or may automatically generate a child window in response to an action taken in conjunction with a parent window.

In general, it may be appreciated that features and functions of the window generator 108 are well-known, but may vary in conjunction with a nature of the underlying or associated application 104. Thus, and particularly given the wide range of applications represented by the application 104, as described above, the present description does not include an exhaustive list or explanation of potential operations/aspects of the window generator 108. Rather, the present description provides a general overview of the window generator 108, along with such specific examples that may be useful in understanding operations of the system 100, and, in particular, of the off-screen control system 102.

Specifically, as shown, the window generator 108 is illustrated as including a window controller 112, which may be configured to interact with, e.g., a control element 114 of the window 110A. In the example context, the control element 114 should be understood to represent virtually any graphical element that is provided in conjunction with the window 110A, and that is operable to receive a command from a user of the system 100, where the command specifies a desired operation to be conducted with respect to the window 110A, including contents thereof. Thus, in operation, the control element 114 may receive a command from a user of the system 100, and may thereafter transmit the command to the window controller 112, which may itself then execute the specified command with respect to the window 110A.

Specific example implementations of the window 110A and/or the control element 114 are provided below, e.g., with respect to FIGS. 3 and 4. However, it may be appreciated from the above description of the window 110A, and of the application 104 and the display 106, that the window 110A represents a wide range of possible windows or types of windows, having a correspondingly wide range of potential control elements and associated operations. As with the window 110A itself, as well as the application 104 and the display 106, the present description does not attempt to provide an exhaustive explanation or listing of examples of the control element 114 and associated operations, which, by themselves, may be well-known in the art.

Thus, a type and nature of the window 110A, and, consequently, a corresponding control element 114, may vary widely. Moreover, various terminologies used to describe the window 110A and the control element 114 also may vary widely, depending on a given context, and within the normal bounds of usage in the art.

Nonetheless, for the sake of providing specific examples, the window 110A should be understood to potentially include, or be referred to as, a pane, a pop-up, a graphical user interface (GUI), a workspace, or similar. Consequently, the control element 114 may include or represent, for example, scrollbars, buttons for minimizing, maximizing, or otherwise reshaping the window 110, or virtually any other control operation that may be provided by the window generator 108 and the window controller 112 with respect to a presentation of the window 110A by the application 104. Specific examples of the window 110A and the control element 114 are provided below, e.g., with respect to FIGS. 3 and 4.

In practice, and as referenced above, the control element 114 is often provided at a periphery of the window 110A, e.g., along an edge of the window 110A, or at a corner thereof. As also described, it is typically possible for a user to position the window 110A at a desired location within the display 106. In particular, a relative size and proportion of the window 110A may be maintained, even when the window 110A is placed in such proximity to a periphery of the display 106 that it is impossible to display an entirety of the window 110A, so that a portion of the window 110A appears to be off of the visible portion of the display 106. In such scenarios, it may occur that the control element 114 is included within the portion of the window 110A that is not viewable within the display 106, so that the control element 114, by itself, becomes effectively useless for its intended purpose while the window 110A is maintained in that position.

For example, the example of FIG. 1 may be understood to represent a use case in which the windows 110A and 110B represent the same window at different points in time and at different locations. In other words, the window 110B in such examples may be understood to represent movement of the window 110A from an original, on-screen position, to a second position at which a lower right-hand corner of the window is positioned off-screen with respect to the display 106. In such a scenario, and given that the control element 114 is, as illustrated, included within the window 110A in a lower right-hand portion thereof, it may be observed that the control element 114 is therefore not included within a visible portion of the display 106, and therefore becomes effectively useless with respect to controlling corresponding operations of the window 110B, as long as the window 110B is maintained in the illustrated position.

In such scenarios, and similar or analogous scenarios, the off-screen control system 102 may be configured to provide a supplemental control element 116, which is itself operable to mimic or duplicate some or all of the control functionality associated with the control element 114. That is, although the control element 114 is neither viewable or usable with respect to the window 110B, the off-screen control system 102 may nevertheless provide the supplemental control element 116 in its place, so as to thereby provide a user of the system 100 with the control features of the control element 114, even while the window 110B is maintained in the illustrated position with respect to the display 106.

For example, the off-screen control system 102 may include a window detector 118 which may be configured to detect or otherwise determine whether and when at least a portion of a window has been moved off-screen with respect to the display 106. For example, the window detector 118 may work in conjunction with the window generator 108, or, more specifically, the window controller 112, in order to monitor a current size and position of a corresponding window within the display 106. In additional or alternative implementations, the window detector 118 may be configured to receive information regarding an off-screen portion of a given window from a user of the system 100. For example, in conjunction with moving a portion of the window 110A off of a visible area of the display 106, the user may launch a keyboard shortcut, or use other appropriate techniques, to inform the window detector 118 of the relevant repositioning of the window.

In conjunction with such detection of the off-screen portion of, e.g., the window 110B, a control identifier 120 of the off-screen control system 102 may be configured to identify which, if any, control element(s) of the window in question have been positioned off-screen, as well as any corresponding control operations for which such control elements are responsible. For example, the control identifier 120 may determine that a scrollbar, a "window minimize" button, and a "window close" button have been positioned off-screen.

A control view generator 122 may be configured to receive the identified controls and associated control operations from the control identifier 120, and thereafter construct/provide the supplemental control element 116 for display within the viewable portion of the display 106. Specific, detailed examples are provided below, but in general, it may be appreciated that the control view generator 122 may be operational to select or otherwise determine relevant subsets of the controls identified by the control identifier 120, or may simply include all of the identified controls within the supplemental control element 116.

Moreover, as also described in detail below, the control view generator 122 may be configured to provide the supplemental control element 116 in a desired or otherwise specified position and manner with respect to the window 110B and/or the display 106. For example, the control view generator 122 may be configured to provide the supplemental control element 116 at a position within the display 106 that is most closely located to the currently off-screen control element 114.

While the supplemental control element 116 is provided by the control view generator 122, a supplemental window controller 124 may be configured to interact with both the supplemental control element 116 and the window controller 112, so as to thereby provide desired control operations with respect to the window 110B, as received from the user by way of the supplemental control element 116.

For example, as in the example scenarios referenced above in which the supplemental control element 116 includes a scrollbar represented by the control element 114, the user may utilize the supplemental control element 116 (i.e., a duplicated scrollbar) to scroll through contents of the window 110B. In such scenarios, the supplemental window controller 124 may be understood to represent an intermediate layer between the supplemental control element 116 and the window controller 112, such that the supplemental window controller 124 receives instructions to scroll in a desired direction from the supplemental control element 116, and thereafter passes corresponding control commands to the window controller 112. Thereafter, the window controller 112 may act in conjunction with the window generator 108 to execute the requested scrolling operation with respect to the window 110B, using otherwise-conventional control techniques with respect thereto.

In the example of FIG. 1, the application 104 and the off-screen control system 102 are illustrated as being executed by at least one computing device 126, which itself includes at least one processor 126A, as well computer readable storage medium 126B. That is, the at least one computing device 126 should be understood to represent any one or more computing devices utilized to implement some or all of each of the application 104 and/or the off-screen control system 102. For example, in some implementations, the application 104 and the off-screen control system 102 may be executed on separate computing devices. More generally, it may be appreciated that any single component of the application 104 and/or the off-screen control system 102 may be implemented using two or more subcomponents, any two of which may be on the same or different computing device, where any two such computing devices may be understood to be in communications with one another over a computer network or other suitable communication channel(s).

Similarly, but conversely, it may be appreciated that any two or more of the application 104, the off-screen control system 102, or components thereof, may be combined for operation as a single component. For example, the off-screen control system 102 may be incorporated within the application 104, and/or any individual component of the off-screen control system 102 may be included within the application 104. In the latter example, for example, the supplemental window controller 124 may be incorporated within the window controller 112.

Similarly, the at least one processor 126A may be understood to represent any one or more processors, executing alone or in parallel, to provide the application 104 and/or the off-screen control system 102. Further, the computer readable storage medium 126B may be understood to represent virtually any storage medium and associated hardware/software that may be useful in storing code for implementing the application 104 and/or the off-screen control system 102. Similarly, the computer readable storage medium 126B may be utilized to store any data associated with operations of the application 104 and/or the off-screen control system 102.

Figure 2:
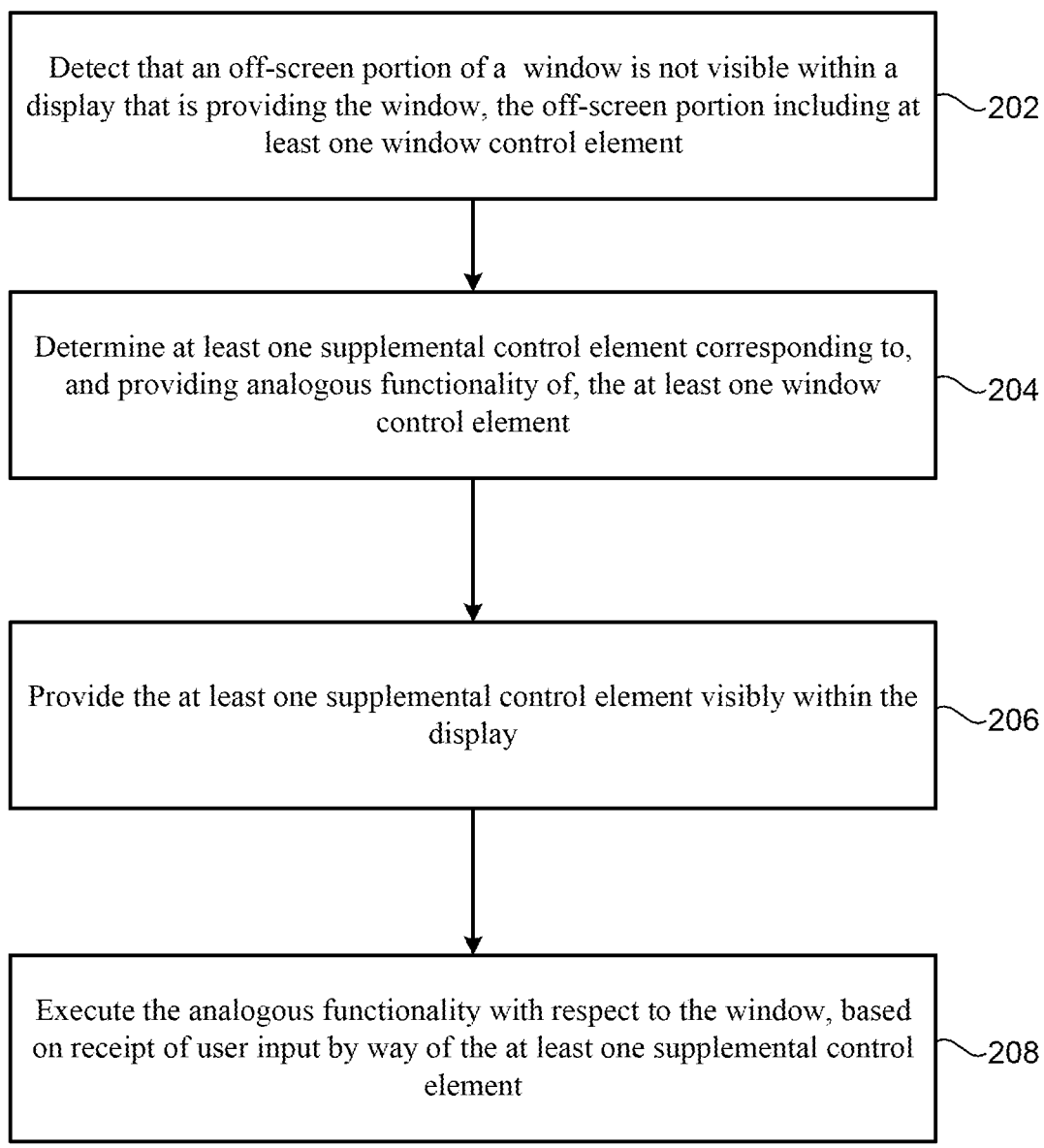
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as separate, sequential operations. However, it will be appreciated that, in additional or alternative implementations, any two or more of the operations 202-208 may be implemented in a partially or completely overlapping or parallel manner. Further, various additional or alternative operations may be included in some implementations, while one or more operations may be omitted. Moreover, in such various implementations, the various operations may be executed in a nested, iterative, or looped fashion.

In the example of FIG. 2, an off-screen portion of a window may be detected as being not visible within a display that is providing the window, the off-screen portion including at least one window control element (202). For example, the window detector 118 of FIG. 1 may directly or indirectly determine that the control element 114 of the window 110A is not visible within the display 106, when the window 110A is moved to the position illustrated with respect to the window 110B. In other example implementations, the window 110B may represent a window that is different from the window 110A, such as when the window 110B is a child window generated in response to some operation of the parent window 110A. In still other implementations, the window 110B may be different from the window 110A, but may experience an off-screen portion which includes a control element analogous to the control element 114, such as when the window 110B is repositioned or resized.

As referenced above, the window detector 118 may detect inclusion of a control element such as the control element 114 in an off-screen portion of a particular window, based on communication with the corresponding window controller 112 and/or window generator 108. For example, the window detector 118 may detect one or more pixel positions of one or more edges of the window 110B, as defined with respect to the display 106. Then, in conjunction with determining a current size of the window 110B, the window detector 118 may provide a determination as to whether and to what extent the window 110B includes an off-screen portion.

As also referenced above, in additional or alternative implementations, the window detector 118 may receive a keyboard shortcut or other affirmative indication from the user of the system 100 that the window 110B currently includes an off-screen portion. For example, the user may wish to position the window 110B as shown, so as to view a most-relevant portion thereof, while still viewing an entirety of the window 110A (e.g., in examples in which the windows 110A, 110B are different from one another). In such scenarios, the user may, at the user's discretion and preference, provide a pre-defined affirmative indication that the current window currently includes an off-screen portion. In such scenarios, examples which are provided in more detail below, e.g., with respect to FIG. 5, the user may indicate a presence of an off-screen portion immediately in response to an occurrence thereof, or may provide such an indication at a later time, such as when the user desires the supplemental control element 116.

At least one supplemental control element corresponding to, and providing analogous functionality of, the at least one window control element may be determined (204). For example, the control identifier 120 may determine that the off-screen portion of the window 110B includes the control element 114 (e.g., in scenarios in which the window 110B represents a repositioned version of the window 110A, or in which the window 110B happens to include its own instance of the control element 114). As described, the control identifier 120 may thus identify a nature and extent of the off-screen control element, and may determine any and all such functionality to be included in the supplemental control element 116.

The at least one supplemental control element may be provided visibly within the display (206). For example, the control view generator 122 may receive indication of the identified controls as provided by the control identifier 120, and, perhaps in the conjunction with the window generator 108, may thus construct and provide the supplemental control element 116.

In so doing, the control view generator 122 may consider various user preferences or requirements of the application 104 which may specify a nature and position of the supplemental control element 116 to be provided. For example, in some example implementations, the supplemental control element 116 may be provided at an edge of the display 106 that is closest to the off-screen control element being replaced by, or supplemented by, the supplemental control element 116.

However, it may be appreciated that the supplemental control element 116 may be positioned and sized in virtually any manner desired by the user and/or specified by the application 104. Moreover, the supplemental control element 116 may itself include control elements designed to permit desired interactions and functionalities with respect thereto. For example, it may be possible for the user to change various features and aspects of an appearance or functionality of the supplemental control element 116.

The analogous functionality may be executed with respect to the window, based on receipt of user input by way of the at least one supplemental control element (208). For example, the supplemental window controller 124 may be configured to provide such user input, received by way of the supplemental control element 116, to the window controller 112. Such user input may be provided by the supplemental window controller 124 in a manner that is indistinguishable or virtually indistinguishable by the window controller 112 from analogous commands that would normally be received by way of the control element 114. Consequently, in such example embodiments, no modifications or additions to the window controller 112 of the application 104 are necessary.

Figure 3:
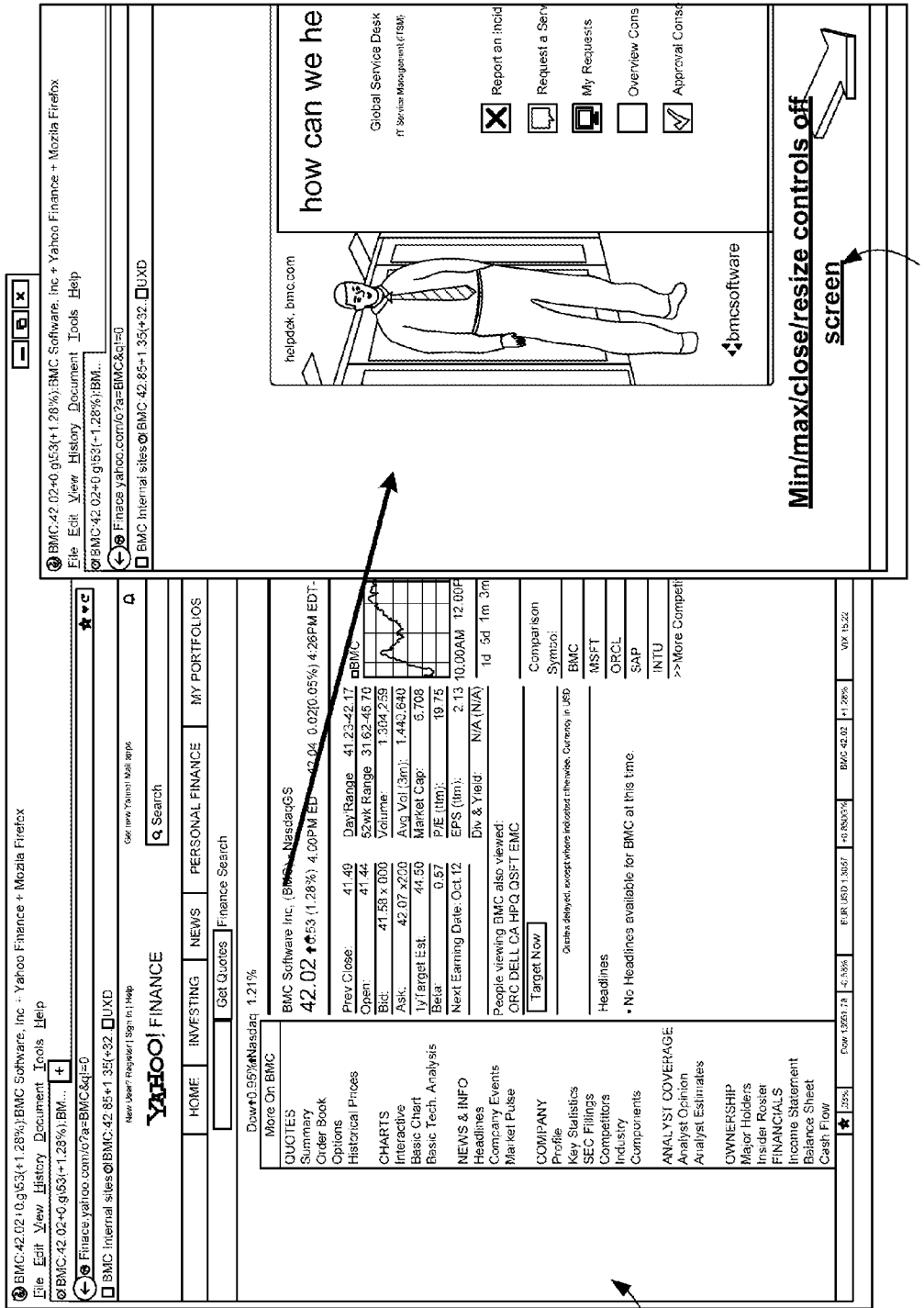
FIG. 3 is a screenshot illustrating an example of a use case for the system of FIG. 1.

FIG. 3 is a screenshot 300 illustrating an example use case for the system 100 of FIG. 1. In the example of the screenshot 300, a first window 302 is illustrated as occupying an entirety of an available display area. Meanwhile, a second window 304 is illustrated as being partially off-screen. Thus, the windows 302, 304 may be understood to correspond to windows 110A, 110B, respectively. Therefore, as described above in similar examples described with respect to FIG. 1, it may be appreciated that various window controls of the window 304 (i.e., corresponding to window control element 114) are currently not visible or otherwise available for use to a viewer of the windows 302, 304. For example, window control elements for minimizing/maximizing the window 304 may be not viewable and unavailable. Similarly, window control elements for closing the window 304, or otherwise resizing the window 304, also may be ostensibly provided by the window 304, yet effectively unavailable to the user in the illustrated example of FIG. 3.

Figure 4:
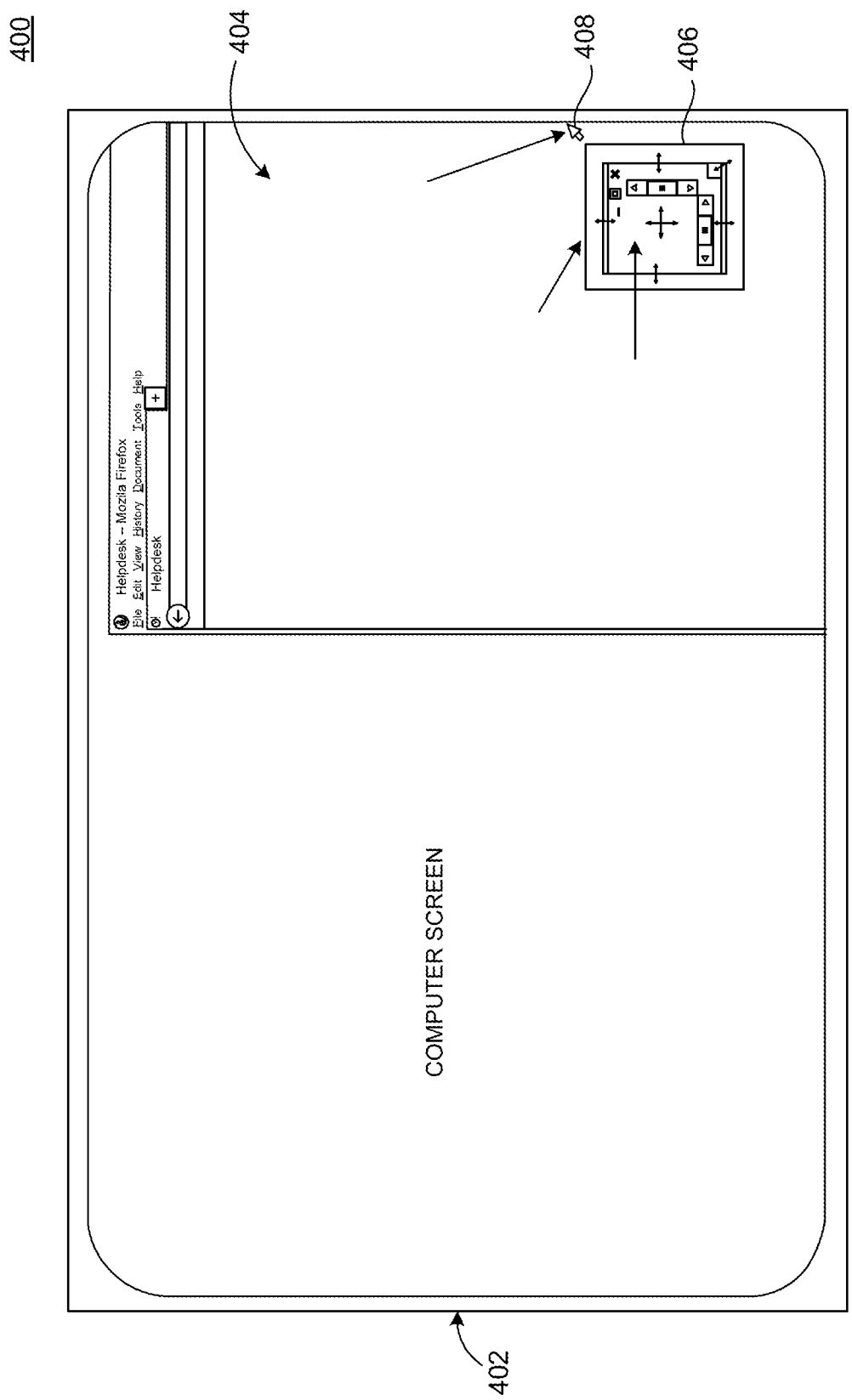
FIG. 4 is a screenshot illustrating example operations of the system of FIG. 1.

FIG. 4 is a screenshot 400 illustrating a similar example scenario as just described with respect to FIG. 3, in which a computer screen 402 is illustrated as providing a window 404. As in the example of FIG. 3, the window 404 has been moved to a lower-right position of the computer screen 402, so that at least a lower and right-hand portion of the window 404 is not visible within the display of the computer screen 402.

Consequently, in accordance with the examples provided above, a supplemental control element 406 may be provided to the user, for use in controlling an operation, appearance, or contents of the window 404. As shown in the example of FIG. 4, and as may be appreciated from the above description, the supplemental control element 406 may include some or all of the control elements of the window 404 that are currently off-screen with respect to the computer screen 402. Thus, in the example of FIG. 4, the supplemental control element 406 is illustrated as including vertical and horizontal scrollbars, resize controllers, and minimize/maximize buttons, as well as a close button.

In the example of FIG. 4, a cursor 408 is illustrated as being utilized by a user to interact with the window 404 and the supplemental control element 406. For example, in common usage scenarios, the user may utilize a mouse or other pointing device to control the cursor 408, and thereby control the window 404. For example, the user may use the mouse and the cursor 408 to move the screen 404 to its illustrated position.

In example embodiments, some of which are described in more detail below with respect to FIG. 5, such operations of the cursor 408 may be utilized by the off-screen control system 102 to perform various functions. For example, the window detector 118 may monitor movements of the cursor 408, e.g., in conjunction with its interactions with the window 404, in order to determine that the window 404 has been moved partially off-screen, and/or to determine that a control element of the window 404 has been moved off-screen.

Additionally or alternatively, the control view generator 122 may utilize operations of the cursor 408 in determining whether, when, and how to provide the supplemental control element 406. For example, the control view generator 122 may provide the supplemental control element 406 in response to observing that the cursor 408 is of any certain proximity to any off-screen edge of the computer screen 402, e.g., to a point that is close to the off-screen control element of the window 404.

For example, in the example of FIG. 4, the control view generator 122 may generate the supplemental control element 406 (e.g., as a pop-up that automatically appears) in response to a detection of the cursor 408 within a certain proximity of the lower-right corner of the computer screen 402. The user may then move the cursor 408 into the pop-up 406 to control the supplemental control element. For example, the supplemental window controller 124 may receive commands and other interactions from the supplemental control element 406 by way of operations of the mouse or other pointing device associated with the cursor 408, in conjunction with corresponding/appropriate placement of the cursor 408 with respect to the supplemental control element 406.

The control view generator 122 may remove or close the supplemental control element 406 in response to a movement of the cursor 408 away from the supplemental control element 406. In other scenarios, as referenced herein, the user may affirmatively cause a closure or removal of the supplemental control element 406, e.g., by clicking on a close element/button.

Of course, use of the cursor 408 in the above usage scenarios should be understood to be for the sake of example and illustration only, and other pointing/tracking mechanisms may be used. Thus, various other techniques may be used (e.g., depending on a context of a particular use case scenario). For example, in scenarios in which the computer screen 402 represents a touch screen, some or all of the functionalities just described may be implemented with respect to detection of the user's finger with respect to the touch screen, as opposed to detection of the cursor 408.

Figure 5:
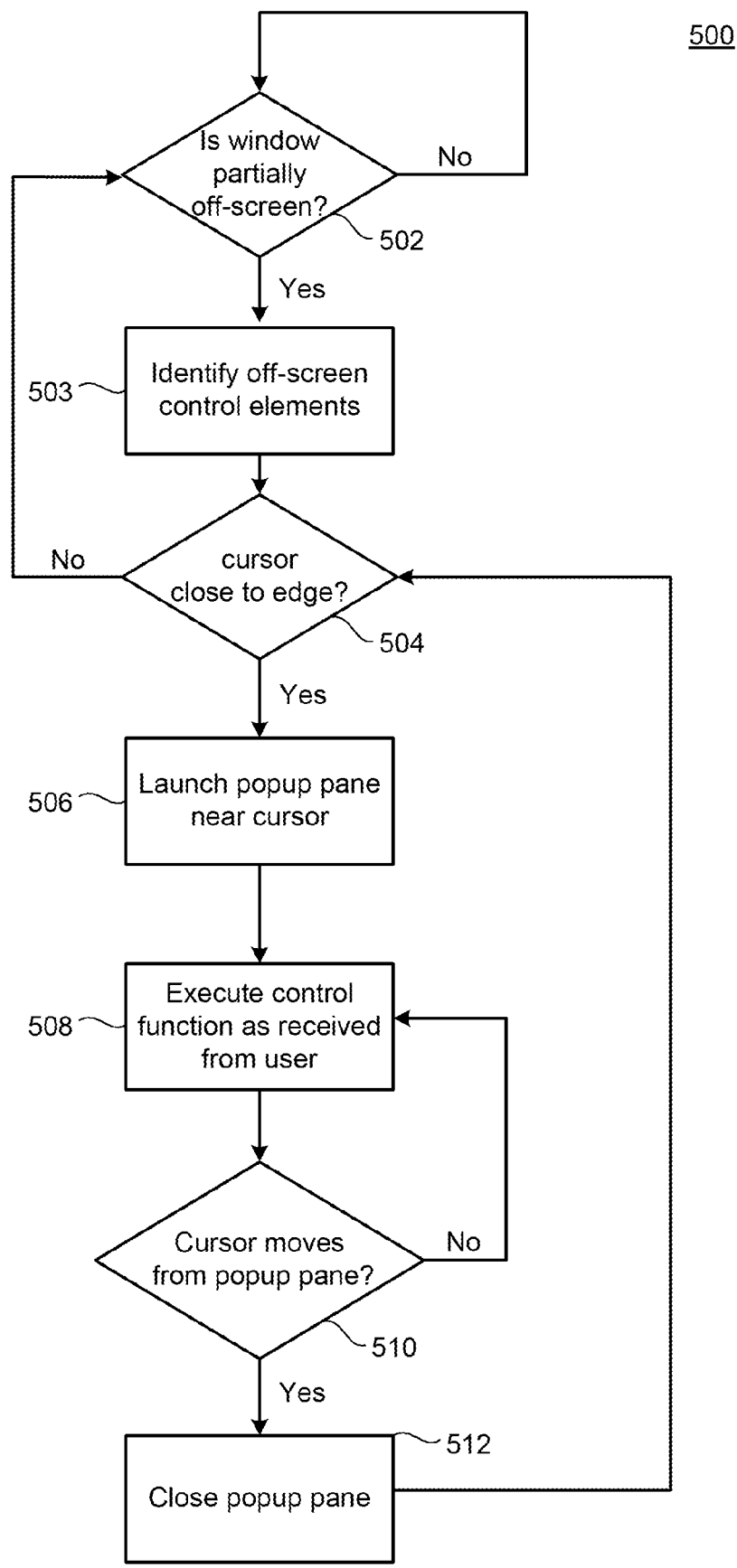
FIG. 5 is a flowchart illustrating more detailed example implementations of the system of FIG. 1, in the context of the example of FIGS. 3 and 4.

FIG. 5 is a flowchart 500 illustrating more detailed example implementations of the system 100 of FIG. 1, in the context of the examples of FIGS. 3 and 4. In the example of FIG. 5, the window detector 118 may first determine whether a particular window is partially off-screen (502). For example, the window detector 118 may make such a determination with respect to any window which is currently selected by (i.e., in focus or otherwise active for) the user. For example, in scenarios such as those illustrated with respect to FIG. 3, in which a plurality of windows are simultaneously open, a user may typically only wish, or be allowed, to interact with a single window at a time. In such cases, the window detector 118, as just referenced, may only make determinations as to whether a window includes any off-screen portion while such a window is currently active for use.

Thus, in example implementations, the window detector 118 may attempt to determine whether a given window includes any off-screen portions in response to a transition of the window from an inactive to an active state. Additionally or alternatively, the window detector 118 may monitor for off-screen portions of the window in response to a movement event of the window (e.g., a drag-and-drop event executed in conjunction with the cursor 408). Further, the window detector 118 may monitor for off-screen portions after predetermined periods of time, or in response to movement of a cursor or other control element to a certain proximity of a screen edge, or in response to a keyboard launch by the user. Such various monitoring activities may continue, until an off-screen portion of a window is detected.

As described above, the control identifier 120 may then determine which control elements of the window in question are included in the off-screen portion of the window (503). The control identifier 120 may provide any such detected control element and associated functionalities to the control view generator 122.

As long as the control view generator 122 is aware that the window in question includes the off-screen portion with the identified control elements, the control view generator 122 may monitor a position of the cursor 408. If the cursor 408 is determined to be within a certain proximity of an edge of the display screen (504), then the control view generator 122 may proceed to launch the supplemental control element 406 in a vicinity, (e.g., directly under) the cursor 408 (506). Otherwise, (504), the control view generator 122 may simply continue to monitor, in conjunction with the window detector 118, whether some or all of the window continues to be partially off-screen (502).

Of course, various additional or alternative techniques may be utilized to determine whether, when, and how to launch the supplemental control element 406, or variations thereof. For example, the supplemental control element 406 may be launched in a simultaneous detection of the off-screen portion of the window, e.g., such as when the detection of the off-screen portion occurs in response to a keyboard-based or other action of the user. Moreover, the supplemental control element 406 need not be positioned in proximity to, or based on, the position of the cursor 408, but, rather, may be positioned initially in any desired location within the compute screen 402. Moreover, as already referenced, regardless of any initial location of the supplemental control element 406, it may be appreciated that the user may be provided with an ability to relocate the supplemental control element 406 to any desired position within the computer screen 402.

Still further, although the supplemental control element 406 is illustrated in FIG. 4, and referred to in FIG. 5, as a pop-up pane or window, it may be appreciated, as referenced above, that the supplemental control element 406 may be implemented in many different ways. For example, the supplemental control element 406 may be embedded within a visible (i.e., on-screen) portion of the window in question e.g., similarly in manner to an inclusion of a bookmark bar or other such element.

As long as the supplemental control element 406 is provided visibly and operational, the supplemental window controller 124 may execute control functions for the window, as received from the user (508). For example, as described, the supplemental window controller 124 may receive commands from the user by way of the supplemental control element 406 to, e.g., scroll horizontally or vertically through content of the window 404, to resize the window 404, or to provide any other such functionality, in conjunction with the original window controller 112.

Then, as also referenced above, one or more various techniques may be utilized to determine whether, when, and how to remove the supplemental control element 406. For example, in FIG. 5, the control view generator 122 may determine whether the cursor 408 is moved from the pop-up pane, i.e., the supplemental control element (510). As long as the cursor remains over the pop-up pane, then the supplemental window controller 124 may continue to receive and execute commands by way of the pop-up pane (508). However, in the event that the cursor 408 is moved outside of a perimeter of the supplemental control element 406 (510), then the control view generator 122 may proceed to close the pop-up pane/supplemental control element 406 (512). Thereafter, operations may proceed as described above, e.g., with determinations as to whether the cursor is again moved close to an edge of the screen 402 (504), and/or whether relevant portions of the window remain off-screen (502).

As referenced above, other techniques may be utilized to close or remove the supplemental control element 406. For example, the supplemental control element 406 may be provided with a close button, which may be selected by the user to close the supplemental control element 406. Additionally, or alternatively, a minimize button may be provided for the supplemental control element 406, so that the user may minimize the supplemental control element 406 without completely closing it. In such scenarios, the supplemental control element 406 may also be automatically closed or removed in conjunction with a minimizing or closing of the original window 404.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system including instructions stored on a non-transitory computer readable storage medium and executable by at least one processor, the system comprising:
    a window detector configured to cause the at least one processor to detect that an off-screen portion of a window is not visible within a display that is providing the window, the off-screen portion including at least one window control element;
    a control identifier configured to cause the at least one processor to determine at least one supplemental control element corresponding to, and providing analogous functionality of, the at least one window control element;
    a control view generator configured to cause the at least one processor to provide the at least one supplemental control element visibly within the display; and
    a supplemental window controller configured to cause the at least one processor to execute the analogous functionality with respect to the window, based on receipt of user input by way of the at least one supplemental control element.

2. The system of claim 1, wherein the window detector is configured to detect the off-screen portion in response to a receipt of a user request for the supplemental control element.

3. The system of claim 1, wherein the window detector is configured to detect the off-screen portion based on pixel positions of the window within the display and relative to an edge of the display.

4. The system of claim 1, wherein the control identifier is configured to determine functionality of the at least one window control element, and further configured to select a subset thereof for inclusion within the supplemental control element.

5. The system of claim 1, wherein the control view generator is configured to provide the at least one supplemental control element in response to a receipt of a user request for the supplemental control element.

6. The system of claim 1, wherein the control view generator is configured to detect a pointing mechanism in proximity to the off-screen portion, and to provide the at least one supplemental control element in response thereto.

7. The system of claim 6, wherein the control view generator is configured to provide the at least one supplemental control element in proximity to the pointing mechanism, and further configured to remove the at least one supplemental control element in response to detecting that the pointing mechanism is no longer in proximity to the off-screen portion.

8. The system of claim 1, wherein the control view generator is configured to provide the at least one supplemental control element in proximity to the off-screen portion.

9. The system of claim 1, wherein the control view generator is configured to provide the at least one supplemental control element as a pop-up window within the display.

10. The system of claim 1, wherein the supplemental window controller is configured to execute the analogous functionality with respect to the window, including exchanging the user input with a window controller of the window that controls the at least one window control element.

11. A method comprising:
    detecting that an off-screen portion of an application window is not visible within a display that is providing the application window, the off-screen portion including at least one window control element;
    determining at least one supplemental control element corresponding to, and providing analogous functionality of, the at least one window control element;
    providing the at least one supplemental control element visibly within the display; and
    executing the analogous functionality with respect to the application window, based on receipt of user input by way of the at least one supplemental control element.

12. The method of claim 11, wherein the detecting includes detecting the off-screen portion based on pixel positions of the window within the display and relative to an edge of the display.

13. The method of claim 11, wherein the providing comprises:
    detecting a pointing mechanism in proximity to the off-screen portion; and
    providing the at least one supplemental control element in response thereto.

14. The method of claim 11, wherein the analogous functionality is executed with respect to the window, including exchanging the user input with a window controller of the window that controls the at least one window control element.

15. A computer program product including instructions recorded on a non-transitory computer readable storage medium and configured to cause at least one processor to:
    detect that an off-screen portion of an application window is not visible within a display that is providing the application window, the off-screen portion including at least one window control element;
    determine at least one supplemental control element corresponding to, and providing analogous functionality of, the at least one window control element;
    provide the at least one supplemental control element visibly within the display; and
    execute the analogous functionality with respect to the application window, based on receipt of user input by way of the at least one supplemental control element.

16. The computer program product of claim 15, wherein the instructions, when executed, are further configured to detect the off-screen portion based on pixel positions of the window within the display and relative to an edge of the display.

17. The computer program product of claim 15, wherein the instructions, when executed, are further configured to detect a pointing mechanism in proximity to the off-screen portion, and to provide the at least one supplemental control element in response thereto.

18. The computer program product of claim 17, wherein the instructions, when executed, are further configured to provide the at least one supplemental control element in proximity to the pointing mechanism, and further configured to remove the at least one supplemental control element in response to detecting that the pointing mechanism is no longer in proximity to the off-screen portion.

19. The computer program product of claim 15, wherein the instructions, when executed, are further configured to provide the at least one supplemental control element as a pop-up window within the display.

20. The computer program product of claim 15, wherein the instructions, when executed, are further configured to execute the analogous functionality with respect to the window, including exchanging the user input with a window controller of the window that controls the at least one window control element.

* * * * *

UNITED STATES PATENT AND TRADEMARK OFFICE
CERTIFICATE OF CORRECTION

| | | |
|---|---|---|
| PATENT NO. | : 9,213,555 B2 | Page 1 of 1 |
| APPLICATION NO. | : 13/850724 | |
| DATED | : December 15, 2015 | |
| INVENTOR(S) | : Ricky Poston et al. | |

It is certified that error appears in the above-identified patent and that said Letters Patent is hereby corrected as shown below:

ON THE TITLE PAGE

Item (74), in column 2, in "Attorney, Agent, or Firm", line 1, delete "Brakes" and insert -- Brake --, therefor.

Signed and Sealed this
Twelfth Day of April, 2016

Michelle K. Lee
*Director of the United States Patent and Trademark Office*